United States Patent
Ding et al.

(10) Patent No.: US 9,785,563 B1
(45) Date of Patent: Oct. 10, 2017

(54) READ COMMAND PROCESSING FOR DATA STORAGE SYSTEM BASED ON PREVIOUS WRITES

(71) Applicant: Western Digital Technologies, Inc., Irvine, CA (US)

(72) Inventors: Lu Ding, Walnut Creek, CA (US); Fyodor Soiguine, Aliso Viejo, CA (US); Chandra Mouli Guda, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/825,738

(22) Filed: Aug. 13, 2015

(51) Int. Cl.
*G06F 12/08* (2016.01)
*G06F 3/06* (2006.01)
*G06F 12/0871* (2016.01)
*G06F 12/0888* (2016.01)

(52) U.S. Cl.
CPC ........ *G06F 12/0871* (2013.01); *G06F 3/0608* (2013.01); *G06F 3/068* (2013.01); *G06F 3/0656* (2013.01); *G06F 3/0658* (2013.01); *G06F 3/0659* (2013.01); *G06F 12/0888* (2013.01); *G06F 2212/1044* (2013.01); *G06F 2212/202* (2013.01); *G06F 2212/217* (2013.01); *G06F 2212/22* (2013.01); *G06F 2212/253* (2013.01); *G06F 2212/281* (2013.01); *G06F 2212/305* (2013.01); *G06F 2212/311* (2013.01); *G06F 2212/604* (2013.01)

(58) Field of Classification Search
CPC ....... G06F 2212/1044; G06F 2212/253; G06F 2212/305; G06F 2212/281; G06F 2212/217; G06F 2212/311; G06F 2212/604; G06F 2212/202; G06F 2212/22; G06F 12/0871; G06F 12/0888; G06F 3/0608; G06F 3/0659; G06F 3/068; G06F 3/0658; G06F 3/0656
See application file for complete search history.

(56) References Cited

U.S. PATENT DOCUMENTS

| | | | |
|---|---|---|---|
| 6,697,881 B2 * | 2/2004 | Cochran | G06F 3/061 382/236 |
| 6,856,556 B1 | 2/2005 | Hajeck | |
| 7,126,857 B2 | 10/2006 | Hajeck | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |

(Continued)

*Primary Examiner* — Michael Krofcheck
(74) *Attorney, Agent, or Firm* — Barry IP Law

(57) ABSTRACT

A read command is received from a host requesting data from a portion of a first memory of a data storage system and it is determined whether one or more sections of the first memory including the portion have previously been written to by the host. If it is determined that the one or more sections have not previously been written to by the host, predetermined data is sent to the host in response to the read command without reading the portion of the first memory. According to another aspect, the requested data from the read command is cached in a second memory of the data storage system based on whether the one or more sections of the first memory have previously been written to by the host.

20 Claims, 5 Drawing Sheets

(56) References Cited

U.S. PATENT DOCUMENTS

| | | | |
|---|---|---|---|
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,852,596 B2 * | 12/2010 | Boyle | G11B 20/1258 360/31 |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 8,874,524 B1 * | 10/2014 | Zhao | G06F 17/30088 707/639 |
| 2003/0074492 A1 * | 4/2003 | Cochran | G06F 3/061 710/5 |
| 2004/0202073 A1 * | 10/2004 | Lai | G06F 3/0625 369/47.33 |
| 2007/0079098 A1 * | 4/2007 | Kitamura | G06F 3/0605 711/170 |
| 2010/0174849 A1 | 7/2010 | Walston et al. | |
| 2010/0214682 A1 * | 8/2010 | Boyle | G11B 20/1258 360/39 |
| 2010/0250793 A1 | 9/2010 | Syu | |
| 2011/0099323 A1 | 4/2011 | Syu | |
| 2011/0283049 A1 | 11/2011 | Kang et al. | |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2013/0132638 A1 | 5/2013 | Horn et al. | |
| 2013/0145106 A1 | 6/2013 | Kan | |
| 2013/0290793 A1 | 10/2013 | Booth et al. | |
| 2013/0326113 A1 | 12/2013 | Wakrat et al. | |
| 2014/0059405 A1 | 2/2014 | Syu et al. | |
| 2014/0101369 A1 | 4/2014 | Tomlin et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |
| 2014/0149826 A1 | 5/2014 | Lu et al. | |
| 2014/0157078 A1 | 6/2014 | Danilak et al. | |
| 2014/0181432 A1 | 6/2014 | Horn | |
| 2014/0223255 A1 | 8/2014 | Lu et al. | |

* cited by examiner

READ COMMAND PROCESSING FOR DATA STORAGE SYSTEM BASED ON PREVIOUS WRITES

BACKGROUND

Data storage systems are often used to record data onto or to reproduce data from a storage media. One type of storage media includes a rotating magnetic disk where a magnetic head of the data storage system can read and write data in tracks on a surface of the disk, such as in a Hard Disk Drive (HDD). Another type of storage media can include a solid-state memory where cells are charged to store data.

Since data can generally be accessed quicker from a solid-state memory than from a disk, some data storage systems may temporarily store or cache certain data that is already stored on a disk in a solid-state memory. A host requesting the cached data can then usually retrieve the cached data quicker than if the data was retrieved from the disk due to a seek time in moving the head to a particular location on the disk.

The determination of which data to cache in the solid-state memory can be made based on a read caching policy that may, for example, cache data that is frequently accessed or has been more recently accessed. Since the storage capacity and life of solid-state memory is typically limited, there is a need to make efficient use of such solid-state memory while still providing for a quick performance of read commands.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
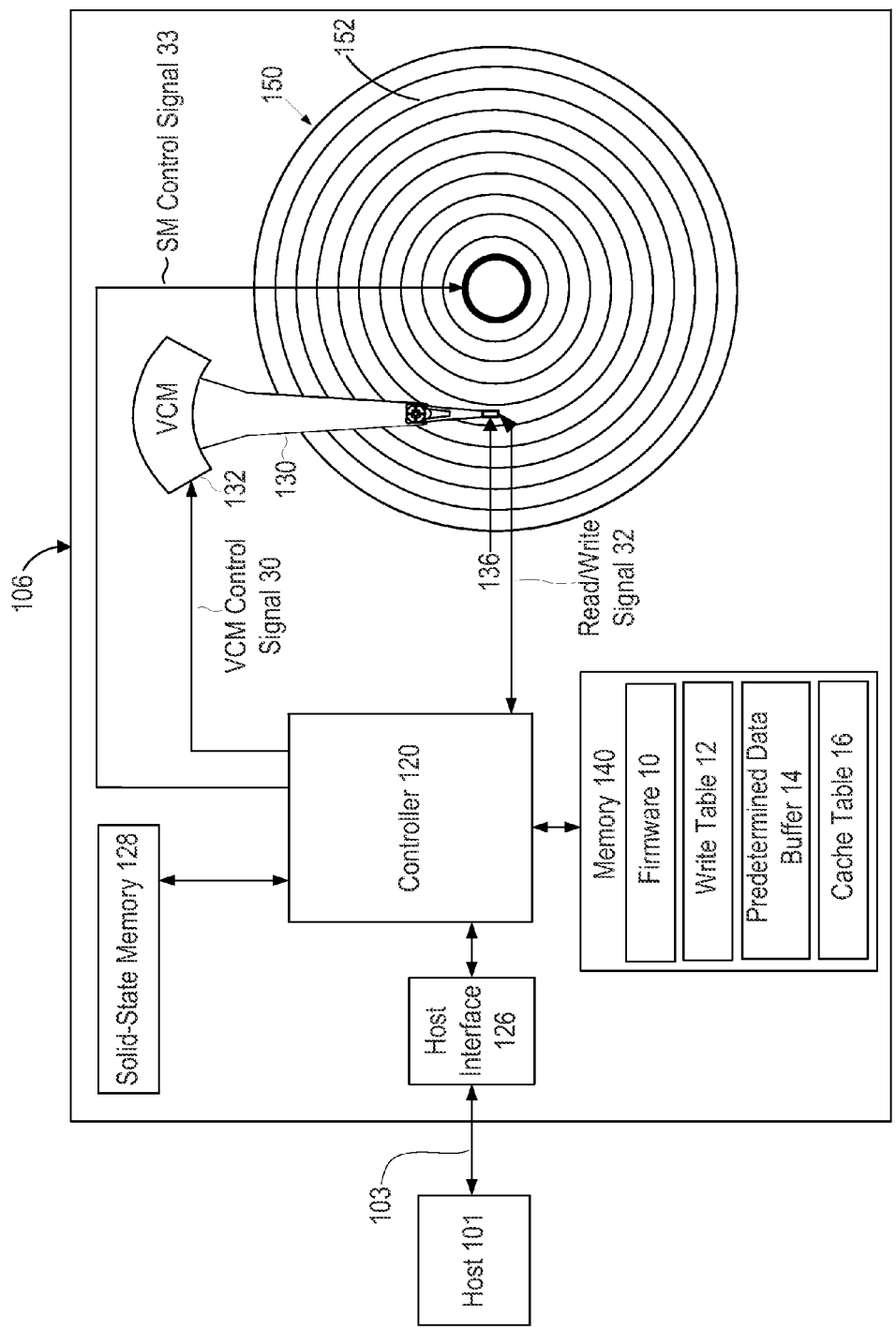
FIG. 1 is a block diagram depicting a data storage system as a single Data Storage Device (DSD) according to an embodiment.

FIG. 1 is a block diagram depicting data storage system 106 according to an embodiment where data storage system 106 is a Data Storage Device (DSD) with at least two different memories. In the example of FIG. 1, data storage system 106 includes rotating magnetic disk 150 as a first memory and solid-state memory 128 as a second memory. In this regard, data storage system 106 can be considered a Solid-State Hybrid Drive (SSHD) since it includes both solid-state and disk media. In other embodiments, each of disk 150 or solid-state memory 128 may be replaced by multiple Hard Disk Drives (HDDs) or multiple Solid-State Drives (SSDs), respectively, so that data storage system 106 includes pools of HDDs and/or SSDs.

Data storage system 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Host interface 126 is configured to interface data storage system 106 with host 101 and may interface according to a standard such as, for example, Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120.

Host 101 communicates with data storage system 106 via network or bus 103 to retrieve data from and store data in data storage system 106. As used herein, a host can refer to a device that is capable of issuing commands to a data storage system or DSD to store data or retrieve data. In this regard, host 101 may include another storage device such as a smart DSD that is capable of executing applications and communicating with other DSDs.

The components of FIG. 1 may or may not be physically co-located. In this regard, network/bus 103 may include a local area network, a wide area network, or the Internet. Those of ordinary skill in the art will also appreciate that other embodiments can include more or less than those elements shown in FIG. 1 and that the disclosed processes can be implemented in other environments. For example, other embodiments can include a different number of hosts or DSDs, as in the embodiment of FIG. 2.

In the example embodiment of FIG. 1, host 101 is separate from data storage system 106, and may include, for example, a server or other computer system. In other embodiments, host 101 and data storage system 106 may be housed together as part of a single electronic device, such as, for example, a desktop, laptop or notebook computer or another type of electronic device such as a tablet, smartphone, network media player, portable media player, or Digital Video Recorder (DVR).

In FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152. A servo system (not shown) of controller 120 controls the rotation of disk 150 with SM control signal 33 and controls the position of head 136 using VCM control signal 30.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

Data storage system 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 1, data storage system 106 includes memory 140, which can include, for example, a Dynamic Random Access Memory (DRAM). Memory 140 can be used by data storage system 106 to temporarily store data. Data stored in memory 140 can include data read from Non-Volatile Memory (NVM) such as disk 150, data to be stored in NVM, instructions loaded from firmware 10 for execution by controller 120, and/or data used in executing firmware 10. Memory 140 can also be used to temporarily store data for write commands intended for disk 150.

In the example of FIG. 1, memory 140 also stores write table 12, predetermined data buffer 14, and cache table 16. As discussed below in more detail with reference to FIG. 3, write table 12 can be used to indicate whether certain sections of a first memory such as disk 150 have been written to by host 101. In one implementation, write table 12 keeps track of whether host 101 has sent a write command for data to be written in a particular mapping unit or block of storage on disk 150.

As discussed in more detail below with reference to FIG. 5, controller 120 can use write table 12 to determine whether one or more sections of the first memory (e.g., disk 150) including a requested portion of the first memory have been written to in responding to a read command from host 101. In the case where host 101 requests data from a portion of the first memory that has not been written to before by host 101, data storage system 106 can return predetermined data from predetermined data buffer 14 rather than read the requested portion of the first memory. The predetermined data in predetermined data buffer 14 can include, for example, null data (e.g., one or more zeros) or another predetermined data pattern. The data stored in predetermined data buffer 14 may also be used by controller 120 as a portion of the predetermined data sent back to host 101 that is repeated so as to match the length of the data requested by host 101.

By returning predetermined data when host 101 requests data from a portion of the first memory that has not been written to before, it is ordinarily possible to save time and system resources by not having to read the requested portion of the first memory. If the requested portion has not been written to before, the portion of the first memory will not store valid data and not reading the portion of the first memory should not affect the result of the read command.

In other embodiments, and as described below with reference to FIG. 6, write table 12 can be used by controller 120 to determine whether to cache data from a first memory (e.g., disk 150) in a second memory (e.g., solid-state memory 128). In this regard, the second memory may provide a quicker access to data than the first memory.

Certain data that is stored in the first memory may therefore be cached in the second memory to provide quicker access to the data in accordance with a read caching policy. Some factors that may be considered in the read caching policy can include how frequently or recently the data has been accessed, a priority level of the data, a size of the data, or a randomness of the data such as whether the data is sequentially addressed.

In determining whether to cache data from a portion of the first memory, controller 120 may further consider or initially consider whether one or more sections of the first memory including the portion have been written to before by host 101. If the one or more sections of the first memory have not been written to before, controller 120 may indicate in cache table 16 that the data for the requested portion has been cached in the second memory without actually caching the data in the second memory. In this regard, cache table 16 can include a list of logical addresses such as Logical Block Address (LBA) ranges that indicate which data is cached in the second memory.

By not actually caching the data in the second memory, it is ordinarily possible to reduce wear on the second memory. In the case where the second memory is a solid-state memory such as a flash memory, there may be a limited number of Program/Erase (P/E) cycles where a particular block of the memory can be rewritten. In addition, since less data can be stored in the second memory, less mapping and maintenance activities such as synchronizing data between the first and second memories is needed. This can save processing and memory resources of data storage system 106.

In operation, host interface 126 receives host read and write commands from host 101 via host interface 126 for reading data from and writing data to NVM of data storage system 106. In response to a write command from host 101, controller 120 may buffer the data to be written for the write commands in memory 140.

For data to be written on disk 150, a read/write channel (not shown) of controller 120 may encode the buffered data into write signal 32 which is provided to head 136 for magnetically writing data on disk 150. A servo system of controller 120 can provide VCM control signal 30 to VCM 132 to position head 136 over a particular track 152 for writing the data.

To read data from disk 150, the servo system positions head 136 over a particular track 152. Controller 120 controls head 136 to magnetically read data stored in the track and to send the read data as read signal 32. A read/write channel of controller 120 can then decode and buffer the data into memory 140 for transmission to host 101 via host interface 126.

For data to be stored in solid-state memory 128, controller 120 receives data from host interface 126 and may buffer the data in memory 140. In one implementation, the data is then encoded into charge values for charging cells (not shown) of solid-state memory 128 to store the data.

To access data stored in solid-state memory 128, controller 120 in one implementation reads current values for cells in solid-state memory 128 and decodes the current values into data that can be transferred to host 101 via host interface 126.

Figure 2:
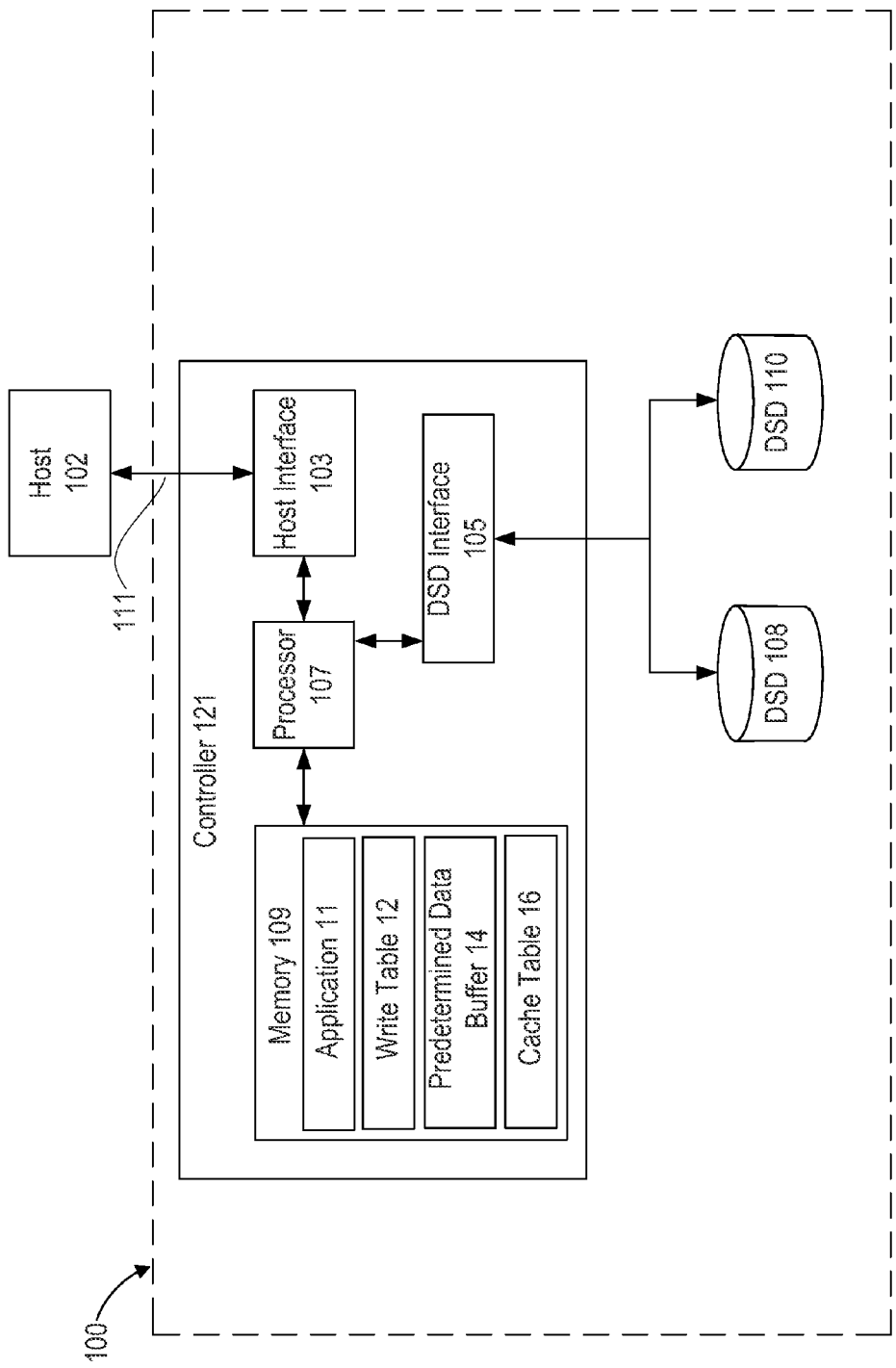
FIG. 2 is a block diagram depicting a data storage system including multiple DSDs according to an embodiment.

FIG. 2 depicts a block diagram of a data storage system including multiple DSDs according to an embodiment. As shown in FIG. 2, data storage system 100 includes controller 121 with DSDs 108 and 110. In the example of FIG. 2, DSD 110 serves as a second memory in data storage system 100 that caches data stored in DSD 108, which serves as a first memory of data storage system 100. Each of DSDs 108 and 110 include NVM for storing data such as a disk and/or a solid-state memory. In one example, DSD 108 can include an HDD and DSD 110 can include an SSD such that DSD 108 provides a greater storage capacity than DSD 110 but DSD 110 typically provides a quicker access to data than DSD 108.

Host 102 communicates with controller 121 via network or bus 111 to retrieve data from and store data in data storage system 100. Controller 102 allocates data among DSDs 108 and 110 and interfaces with DSDs 108 and 110 via DSD interface 105, which may interface according to a standard such as, for example, PCIe, SATA, SCSI, or SAS.

Controller 121 also interfaces with host 102 via host interface 103, which may interface with host 102 according to a standard such as, for example, Ethernet. Controller 121 and host 102 may be remotely located from each other via a network. Similarly, controller 121 and one or both of DSDs 108 and 110 need not be physically in the same location. For example, one or both of DSDs 108 and 110 can be located in a different room, building, or city than another DSD or from controller 121.

Those of ordinary skill in the art will appreciate that data storage system 100 can include more or less than those components shown in FIG. 2 and that the disclosed processes can be implemented in other environments. For example, in other embodiments, controller 121 may form a part of DSD 108 or DSD 110.

In the example environment of FIG. 2, controller 121 includes processor 107 which can be implemented using one or more processors for executing instructions such as a microcontroller, a DSP, an ASIC, an FPGA, hard-wired logic, analog circuitry and/or a combination thereof. A processor of controller 121 as referenced hereinafter can be one or more of the foregoing processors or another processor configured to perform functions described herein.

Controller 121 also includes memory 109 that can comprise a computer readable medium of various types of volatile or non-volatile RAM that provide information stored in memory 109 to processor 107 during execution of instructions in software programs such as application 11, which controls operation of data storage system 100. Memory 109 also stores data that is used by processor 107 such as write table 12, predetermined data buffer 14, and cache table 16.

In the example embodiment of FIG. 2, host 102 is separate from data storage system 100, and may include, for example, a server or other computer system. Storage system 100 may serve as, for example, a data center or part of a data center with multiple DSDs for tiered storage where data is stored on a particular DSD of data storage system 100 based on characteristics of the data or an access frequency of the data. In this regard, DSD 108 can typically provide a quicker access to data than DSD 110. Certain data that is stored in DSD 108 may therefore be cached in DSD 110 in accordance with a caching policy to provide quicker access to the data. Some examples of data that may be cached in DSD 110 can include data that is more frequently accessed, assigned a higher priority, data that is smaller than a predetermined size, or data that is randomly written (e.g., non-sequentially addressed data).

As with data storage system 106 of FIG. 1, controller 121 of data storage system 100 in FIG. 2 can use write table 12 to determine whether particular portions of a first memory (e.g., DSD 108) have been written to by host 102. Controller 121 may also use predetermined data buffer 14 to return predetermined data to host 102 without reading a portion of DSD 108 in the case where the portion of DSD 108 has not been written before by host 102. The predetermined data can include, for example, null data (e.g., one or more zeros) or another predetermined data pattern. The data stored in predetermined data buffer 14 may also be used by controller 121 as a portion of the predetermined data sent back to host 102 that is repeated so as to match the length of the data requested by host 102.

In other embodiments, write table 12 can be used by controller 121 in addition to a read caching policy to determine whether to cache data from DSD 108 in DSD 110. Some factors that may be considered by the read caching policy can include how frequently or recently the data has been accessed, a priority level of the data, the size of the data, or a randomness of the data such as whether the data is sequentially addressed.

In determining whether to cache data from a portion of DSD 108, controller 121 may further consider whether one or more sections of DSD 108 including the portion have been written before by host 102. If the one or more sections of DSD 108 have not been written to before, controller 121 may indicate in cache table 16 that the data for requested portion has been cached in DSD 110 without actually caching the data in DSD 110. The indication that the data has been cached can be made in cache table 16, which can include a list of logical addresses such as LBA ranges that indicate the data that is cached in DSD 110.

By not actually caching the data in DSD 110, it is ordinarily possible to reduce wear on DSD 110. In addition, since less data is stored in DSD 110, less mapping and maintenance activities such as synchronizing data between DSD 108 and DSD 110 are needed. This can save processing and memory resources of data storage system 100.

Write Examples

Figure 3:
FIG. 3 illustrates an example of a write table according to an embodiment.

FIG. 3 illustrates an example of write table 12 according to an embodiment. Write table 12 can be stored as its own data structure as shown in the examples of FIGS. 1 and 2 discussed above, or may form part of another data structure such as a mapping table that maps logical addresses to physical addresses in the data storage system.

As shown in FIG. 3, write table 12 includes a mapping unit and a written flag for each mapping unit. The mapping unit indicates a section of a first memory (e.g., disk 150 in FIG. 1 or DSD 108 in FIG. 2) and can have a fixed size, such as a sector size of 512 or 4,096 bytes for sectors within tracks 152 on disk 150 for example. An address such as an LBA or a range of addresses may indicate the sections of the first memory in write table 12. In other implementations, a mapping unit in write table 12 can correspond to a differently sized section of the first memory such as, for example, a track or a group of tracks or sectors.

The written flags in write table 12 indicate whether a corresponding section of the first memory has been written before by a host. The written flag is set when any part of the section has been written. In the example of FIG. 3, a written flag value of "1" indicates that a section corresponding to the mapping unit has been written before and a value of "0" indicates that the section has not been written before. As shown in FIG. 3, at least part of the sections corresponding to mapping units 0 and 1 have been written before. Other implementations of write table 12 may use a different indicator of whether a particular section of the first memory has been written before.

In most situations, the written flags remain set as written across power cycles of the data storage system. If write table 12 is maintained in a volatile memory, write table 12 can be backed up or non-volatilely stored to NVM before the data storage system shuts down so that the information stored in write table 12 remains available after powering up. In some implementations, a command from a host such as a TRIM command can reset a written flag to indicate that data has not been written, such as when the data is no longer valid. In addition, the written flags of write table 12 may be reset in another implementation if the first memory is reformatted or completely erased.

Figure 4:
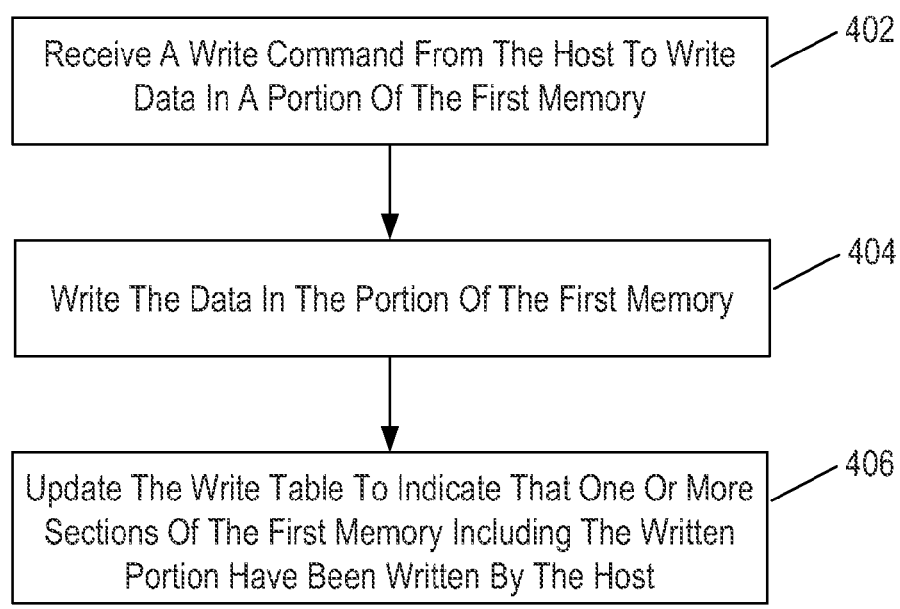
FIG. 4 is a flowchart for a write process according to an embodiment.

FIG. 4 is a flowchart for a write process that can be performed by controller 120 executing firmware 10 or by controller 121 executing application 11 according to an embodiment. In block 402, the data storage system (e.g., data storage system 106 of FIG. 1 or data storage system 100 of FIG. 2) receives a write command from a host to write data in a portion of the first memory (e.g., disk 150 in FIG. 1 or DSD 108 in FIG. 2).

In block 404, the controller stores the data in the portion of the first memory and updates write table 12 in block 406 to indicate that one or more sections of the first memory including the written portion has been written by the host. The written portion may fully overlap one or more sections indicated in write table 12 or may only cover part of a section. For example, the written portion may cover one full section of the first memory and two partial sections on opposite sides of the fully covered section. In such an example, the controller would update write table 12 to indicate that all three sections have been written to even though two of the sections were only partially written.

As discussed above with reference to FIG. 3, updating write table 12 in block 404 can include changing one or more written flags in write table 12 to indicate that the portion of the first memory has been written. This information can later be used after receiving a read command to determine whether data was previously written in a portion of the first memory before reading the portion. As noted above, this can save time and system resources in not having to fully perform certain read commands or by not having to cache data for a portion of the first memory that has not been written before.

Read Examples

Figure 5:
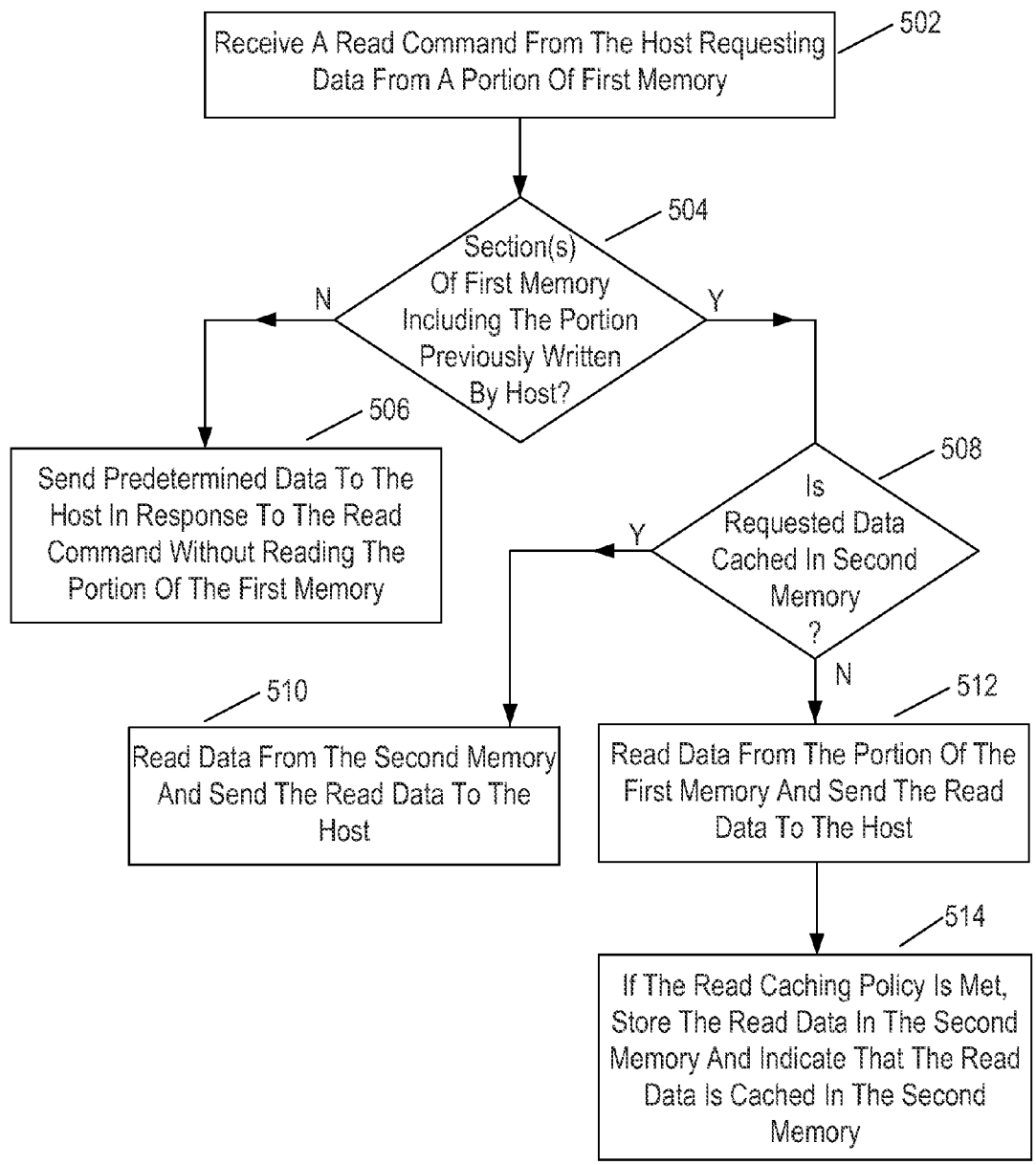
FIG. 5 is a flowchart for a read process according to an embodiment.

FIG. 5 is a flowchart for a read process that can be performed by controller 120 executing firmware 10 or by controller 121 executing application 11 according to an embodiment. In block 502, the data storage system (e.g., data storage system 106 of FIG. 1 or data storage system 100 of FIG. 2) receives a read command from the host requesting data from a portion of a first memory (e.g., disk 150 in FIG. 1 or DSD 108 in FIG. 2).

In block 504, the controller determines whether one or more sections of the first memory including the portion have been previously written by the host. This can be accomplished by checking write table 12 for one or more mapping units including the portion of the first memory. If the written flag has been set for any of the mapping units including the requested portion, the controller determines that one or more sections including the requested portion have been written by the host.

On the other hand, if the written flag for all of the mapping units including the requested portion does not indicate that the host previously wrote data to the one or more mapping units or sections, the controller in block 506 sends predetermined data to the host in response to the read command without reading the portion of the first memory. The predetermined data can come from or be generated using predetermined data stored in predetermined data buffer 14. In one implementation, the predetermined data includes null data such as a series of zeros to match a length of the data requested by the host.

If it is determined that one or more sections including the requested portion have been previously written, the controller in block 508 determines whether the requested data is cached in a second memory (e.g., solid-state memory 128 in FIG. 1 or DSD 110 in FIG. 2). The controller may determine whether the requested data is cached by checking cache table 16.

If the requested data is cached in the second memory, the controller in block 510 reads the requested data from the second memory and sends the read data to the host to complete the read command. If the requested data is not cached in the second memory, the controller in block 512 reads the requested data from the portion of the first memory and sends the read data to the host to complete the read command.

In block 514, the controller determines whether the read command received in block 502 meets a read caching policy. If so, the controller stores the read data in the second memory. As noted above, a read caching policy can consider, for example, how frequently or recently the data has been accessed, a priority level of the data, the size of the data, or a randomness of the data such as whether the data is sequentially addressed. If the read data is stored in the second memory, the controller indicates that the read data is cached in the second memory using cache table 16.

Read Caching Examples

Figure 6:
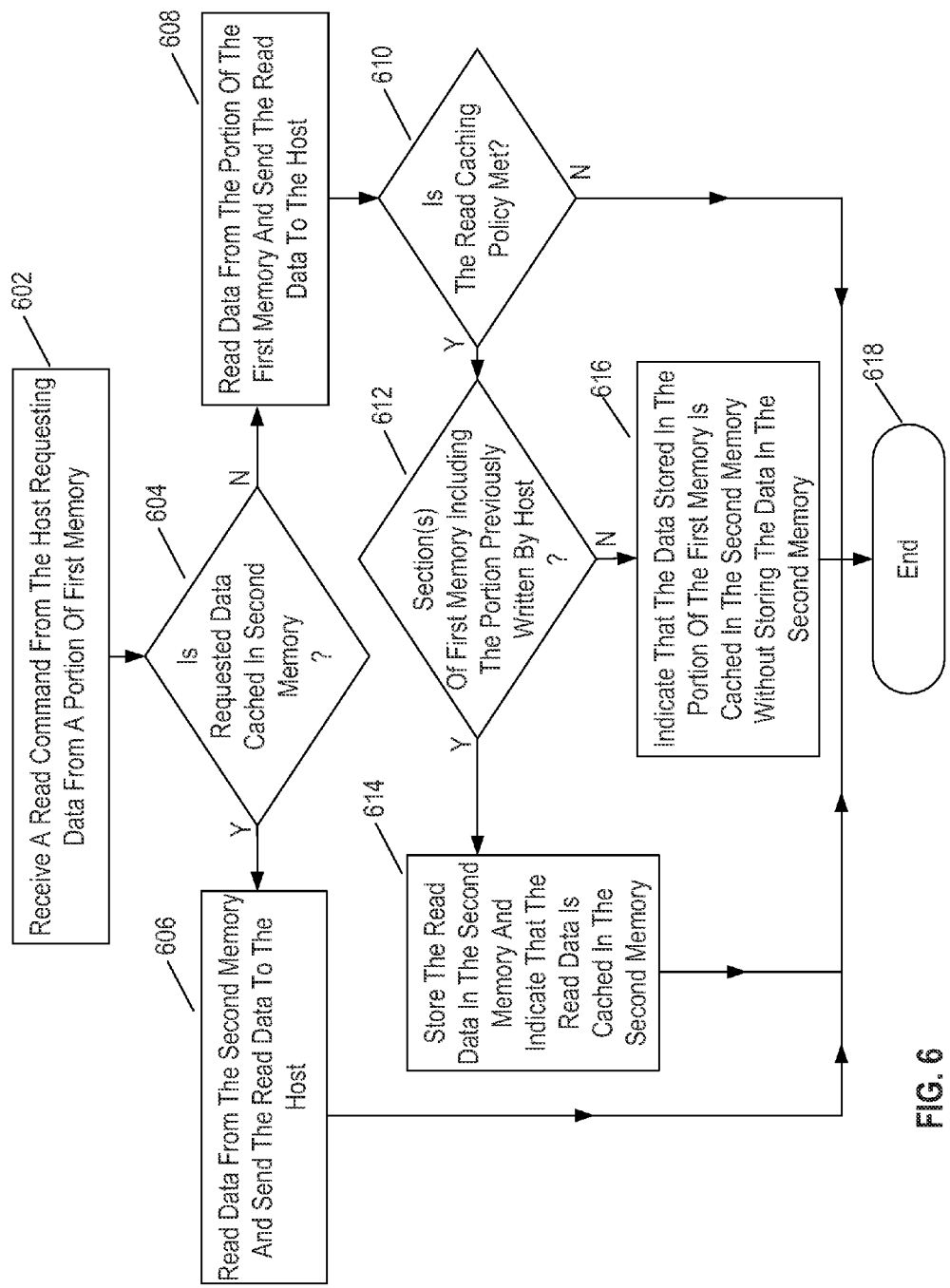
FIG. 6 is a flow chart for a read caching process according to an embodiment.

FIG. 6 is a flowchart for a read caching process that can be performed by controller 120 executing firmware 10 or by controller 121 executing application 11 according to an embodiment. The read caching process of FIG. 6 differs from the read process of FIG. 5 discussed above in that the controller does not initially determine whether one or more sections of the first memory have been written before performing a read command for a requested portion of the first memory. Instead, the controller checks whether one or more sections have been previously written to determine whether to cache the requested data in the second memory.

In block 602, the controller receives a read command from a host requesting data from a portion of a first memory (e.g., disk 150 in FIG. 1 or DSD 108 in FIG. 2). In block 604, the controller determines whether the requested data is cached in the second memory (e.g., solid-state memory 128 in FIG. 1 or DSD 110 in FIG. 2). This determination can be made by checking cache table 16. If the requested data is cached in the second memory, the controller in block 606 reads the requested data from the second memory and sends it to the host to complete the read command. The read caching process of FIG. 6 then ends in block 618.

On the other hand, if the requested data is not cached in the second memory, the controller in block 608 reads the data from the requested portion of the first memory and sends the read data to the host.

In block 610, the controller determines whether a read caching policy has been met. If not, the process ends in block 618. If the read caching policy is met, the controller in block 612 determines whether one or more sections of the first memory including the requested portion have been previously written by the host. This determination can be made by checking write table 12 for one or more sections including the requested portion.

If one or more sections including the requested portion were previously written, the controller stores the read data in the second memory and indicates that the read data is cached in the second memory. The indication that the read data has been cached can, for example, involve modifying cache table 16 to include an address range (e.g., LBA range) associated with the read data.

If it is determined in block 612 that the portion of the first memory has not been previously written by the host, the controller indicates in block 616 that the requested data stored in the first portion of the first memory has been cached in the second memory without actually storing the requested data in the second memory. As discussed above, this can allow for less wear on the second memory and also for conserving space in the second memory by not having to store null or otherwise invalid data in the second memory. In addition, there is also a reduction in the amount of mapping and maintenance activities such as synchronizing data between the first and second memories. This can save processing and memory resources of the data storage system since the portions for the unwritten data can ordinarily be skipped during maintenance activities.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage system, comprising:
   a first memory for storing data;
   a second memory for caching data stored in the first memory, and for completing read commands without reading the data stored in the first memory; and
   a controller configured to:
     receive a read command from a host requesting data from a portion of the first memory;
     send the requested data to the host to complete the read command;
     determine whether one or more sections of the first memory including the portion have previously been written to by the host; and
     based on whether the one or more sections of the first memory have previously been written to by the host, cache the requested data in the second memory for completing a future read command for the requested data without reading the requested data from the first memory
   wherein if it is determined that the one or more sections of the first memory have not previously been written to by the host, the controller is further configured to indicate in a cache table that the requested data stored in the portion of the first memory has been cached in the second memory without caching the requested data stored in the portion of the first memory.

2. The data storage system of claim 1, wherein the controller is further configured to maintain a write table indicating whether a plurality of sections of the first memory have been previously written to by the host.

3. The data storage system of claim 1, wherein the first memory includes at least one rotating magnetic disk and the second memory includes a solid-state memory.

4. The data storage system of claim 1, wherein the first memory includes a first Data Storage Device (DSD) and the second memory includes a second DSD.

5. The data storage system of claim 1, wherein if it is determined that the one or more sections of the first memory have previously been written to by the host, the controller is configured to cache the requested data in the second memory; and
   wherein if it is determined that the one or more sections of the first memory have not previously been written to by the host, the controller is configured to not cache the requested data in the second memory.

6. The data storage system of claim 1, wherein the controller is further configured to cache the requested data in the second memory based on a read caching policy in addition to whether the one or more sections of the first memory have previously been written to by the host.

7. The data storage system of claim 1, wherein the controller is further configured to determine whether the one or more sections of the first memory including the portion have previously been written to by the host by checking a write table indicating whether a plurality of sections of the first memory have been previously written to by the host.

8. The data storage system of claim 1, wherein if it is determined that the one or more sections of the first memory have not previously been written to by the host, the controller is configured to send predetermined data to the host in response to the read command without reading the portion of the first memory.

9. The data storage system of claim 8, wherein the predetermined data is null data.

10. The data storage system of claim 8, further comprising a volatile memory, and wherein the controller is further configured to store the predetermined data or a repeated portion of the predetermined data in a buffer of the volatile memory.

11. A method of operating a data storage system, the method comprising:
receiving a read command from a host requesting data from a portion of a first memory of the data storage system;
sending the requested data to the host to complete the read command;
determining whether one or more sections of the first memory including the portion have previously been written to by the host; and
based on whether the one or more sections of the first memory have previously been written to by the host, caching the requested data in a second memory of the data storage system for completing a future read command for the requested data without reading the requested data from the first memory;
wherein if it is determined that the one or more sections of the first memory have not previously been written to by the host, the method further comprises indicating in a cache table that the requested data stored in the portion of the first memory has been cached in the second memory without caching the requested data stored in the portion of the first memory.

12. The method of claim 11, further comprising maintaining a write table indicating whether a plurality of sections of the first memory have been previously written to by the host.

13. The method of claim 11, wherein the first memory includes at least one rotating magnetic disk and the second memory includes a solid-state memory.

14. The method of claim 11, wherein the first memory includes a first Data Storage Device (DSD) and the second memory includes a second DSD.

15. The method of claim 11, wherein if it is determined that the one or more sections of the first memory have previously been written to by the host, the requested data is cached in the second memory; and
wherein if it is determined that the one or more sections of the first memory have not previously been written to by the host, the requested data is not cached in the second memory.

16. The method of claim 11, further comprising caching the requested data in the second memory based on a read caching policy in addition to whether the one or more sections of the first memory have previously been written to by the host.

17. The method of claim 11, further comprising determining whether the one or more sections of the first memory including the portion have previously been written to by the host by checking a write table indicating whether a plurality of sections of the first memory have been previously written to by the host.

18. The method of claim 11, wherein if it is determined that the one or more sections of the first memory have not previously been written to by the host, the method further comprises sending predetermined data to the host in response to the read command without reading the portion of the first memory.

19. The method of claim 18, wherein the predetermined data is null data.

20. The method of claim 18, further comprising storing the predetermined data or a repeated portion of the predetermined data in a buffer of a volatile memory of the data storage system.

* * * * *